(12) United States Patent
Tanaka

(10) Patent No.: US 8,621,280 B2
(45) Date of Patent: Dec. 31, 2013

(54) FAILURE REPRODUCING APPARATUS AND FAILURE REPRODUCING METHOD

(75) Inventor: Yoshiteru Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 43 days.

(21) Appl. No.: 13/137,515

(22) Filed: Aug. 23, 2011

(65) Prior Publication Data

US 2011/0314335 A1 Dec. 22, 2011

Related U.S. Application Data

(63) Continuation of application No. PCT/JP2009/053755, filed on Feb. 27, 2009.

(51) Int. Cl.
*G06F 11/00* (2006.01)

(52) U.S. Cl.
USPC .......................................................... 714/33

(58) Field of Classification Search
USPC .......................................................... 714/33
See application file for complete search history.

(56) References Cited

U.S. PATENT DOCUMENTS 6,002,869 A * 12/1999 Hinckley ...................... 717/124
2009/0132858 A1* 5/2009 Koeda et al. .................... 714/37

FOREIGN PATENT DOCUMENTS

| JP | 6-139093 | 5/1994 |
| JP | 6-265597 | 9/1994 |
| JP | 8-50555 | 2/1996 |
| JP | 9-244913 | 9/1997 |

OTHER PUBLICATIONS

International Search Report for PCT/JP2009/053755, mailed May 12, 2009.

\* cited by examiner

*Primary Examiner* — Scott Baderman
*Assistant Examiner* — Jigar Patel
(74) *Attorney, Agent, or Firm* — Staas & Halsey LLP

(57) ABSTRACT

A failure reproducing apparatus according to the present invention includes a log analyzing unit that determines processes that have caused a failure when the failure has occurred in a server system, a target-value calculating unit that calculates a target value on the basis of execution time of each process, and a time-lag calculating unit that calculates a time lag. An execution control unit adjusts timing of outputting an execution command of each process to the server system on the basis of the target value and the time lag and executes a reproduction test.

6 Claims, 16 Drawing Sheets

| DATE AND TIME | PROCESS |
|---|---|
| 2008/09/02 10:52:13 | device A turn off start |
| 2008/09/02 10:52:24 | get device info start |
| ⋮ | ⋮ |

| DATE AND TIME | PROCESS (PROCESS OF REPRODUCTION TEST) | PROCESS COMPLETION DURATION |
|---|---|---|
| 2008/09/02 10:52:14 | device A turn off start | 7.3 |
| 2008/09/02 10:52:26 | get device info start | 4.6 |
| ⋮ | ⋮ | ⋮ |

| |
|---|
| device * turn off start |
| get device info timeout |
| ⋮ |

| USER OPERATION | PROCESS BY SYSTEM MANAGEMENT SOFTWARE (LOG CONTENTS) |
|---|---|
| REQUEST HTML DISPLAY | get device info start |
| - | get device info finished |
| POWER OFF OF HARDWARE (A) | device A turn off start |
| - | device A turn off finished |

| PROCESS | DATE AND TIME |
|---|---|
| device A turn off start | 2008/09/02 10:52:09 |
| get device info start | 2008/09/02 10:52:24 |
| ⋮ | ⋮ |

| PROCESS-1 COMPLETION DURATION | DELAY TIME (SECOND) | PROCESS-2 COMPLETION DURATION | NUMBER OF EXECUTIONS | NUMBER OF FAILURES |
|---|---|---|---|---|
| 7.3 | 0 | 4.6 | 1 | 0 |
| 10 | 4.2 | 9.9 | 3 | 3 |
| 5.1 | 1.8 | 6.2 | 8 | 2 |
| ⋮ | ⋮ | ⋮ | ⋮ | ⋮ |

| PROCESS 1 | EXECUTION TIME OF PROCESS 1 | PROCESS 2 | EXECUTION TIME OF PROCESS 2 | TIME LAG |
|---|---|---|---|---|
| device A turn off start | 2008/09/02 10:52:09 | get device info start | 2008/09/02 10:52:24 | 0.1 ms |
| | ⋮ | | ⋮ | 0.07 ms |
| | ⋮ | | ⋮ | 1.5 ms |
| ⋮ | ⋮ | ⋮ | ⋮ | ⋮ |

107

FAILURE REPRODUCING APPARATUS AND FAILURE REPRODUCING METHOD

CROSS-REFERENCE TO RELATED APPLICATION

This application is a continuation of International Application No. PCT/JP2009/053755, filed on Feb. 27, 2009, the entire contents of which are incorporated herein by reference.

FIELD

The embodiment discussed herein is directed to a failure reproducing apparatus, and a failure reproducing method.

BACKGROUND

FIG. 19 is a diagram of a configuration of a server system 10 as a conventional information processing apparatus. As illustrated in FIG. 19, the server system includes a plurality of server units 12a to 12d, on each of which an OS (Operating System) runs, and a managing unit 11 that monitors and controls the server units 12a to 12d.

The managing unit 11, such as a service processor (SVP), as a system managing device displays information about each of the server units 12a to 12d in the HTML (Hyper Text Markup Language) format in response to a request from a user 1. System management software 13 is installed on the server unit 12a (also on the server units 12b to 12d). The system management software 13 acquires information inside the server unit 12a and controls power supply to hardware (driver) 15.

When, for example, acquiring information from an OS 14, the system management software 13 sends the acquired information in response to a request from the managing unit 11 or re-acquires new information as needed. When the user 1 controls hardware on the server units 12a to 12d, the user 1 issues a request directly to the system management software 13, and the system management software 13 controls the power supply to the hardware 15 via the OS 14.

The system management software 13 stores a series of processes in a log file in a storage device 16 that is a memory. When abnormality occurs, it is possible to identify a cause of the abnormality by analyzing the log file. The log file contains contents of processes, information on process execution time, and the like.

Meanwhile, in the server system illustrated in FIG. 19, information acquisition performed by the system management software 13 may be influenced by a hardware control process. FIG. 20 is a diagram explaining how the information acquisition is influenced by hardware control.

In an example illustrated in FIG. 20, it is explained that the user 1 performs power-OFF operation and screen display operation. When the user 1 performs the power-OFF operation (Step S10), the system management software 13 sends a power-OFF request to the OS 14 (Step S11).

The OS 14 checks presence of a device as a hardware resource of each server unit, and when a device to be a process object is present, starts a process (Step S12). The hardware 15 starts power-OFF (Step S13), completes the power-OFF (Step S14), and sends a notice of completion of the power-OFF to the OS 14 (Step S15).

When acquiring the notice of completion of the power-OFF, the OS 14 records, in a log file, information indicating that the device is deleted, and sends the notice of completion of the power-OFF to the system management software 13 (Step S16). When acquiring the notice of completion of the power-OFF, the system management software 13 sends the notice of completion of the power-OFF (Step S17), and the user 1 receives a notice of process completion (Step S18).

Meanwhile, if the user 1 performs the screen display operation at approximately the same time as the power-OFF operation (Step S20), the managing unit 11 sends an information acquisition request to the system management software 13 (Step S21), and the system management software 13 sends the information acquisition request to the OS 14 (Step S22).

When the OS 14 receives the information acquisition request from the system management software 13, the power of the hardware 15 is already OFF. However, because the OS 14 has not yet acquired the notice of completion of the power-OFF from the hardware 15, the OS 14 starts an information acquisition process (Step S23). Therefore, in this case, order of processes is disturbed.

In this case, because the power of the hardware 15 is OFF, the information acquisition ends in failure (Step S24), and the OS 14 sends a notice of a failure indicating that the information acquisition has ended in failure to the system management software 13 (Step S25). The system management software 13 returns an error to the managing unit 11 (Step S26), the managing unit 11 displays a screen indicating that the information acquisition has ended in failure (Step S27), and the user 1 confirms the display (Step S28).

When a failure that is dependent on timing of processes occurs as explained above with reference to FIG. 20, a test (hereinafter, a failure reproduction test) is performed to reproduce a process with which a failure has occurred and the failure that has occurred due to execution timing of the process or the like, in order to identify a cause of the failure. In the reproduction test, a failure reproducing apparatus is caused to perform user's operation illustrated in FIG. 19, and the failure reproducing apparatus repeatedly executes various processes on the server system 10 by changing process timing or contents of processes in order to realize an environment in which the failure has occurred as well as to identify a process with which the failure has occurred and timing of the process. However, it is difficult for the failure reproducing apparatus to adjust timing of a process to be executed in the server unit to desired timing.

For example, an example will be explained in which, as illustrated in FIG. 1, the failure reproducing apparatus sends an information acquisition request and a hardware control process request to the server system and reproduces timing of a process with which a failure occurs. The information acquisition request output from the failure reproducing apparatus to the server system 10 is sent to the system management software 13 via the managing unit 11 while the hardware control is sent to the system management software 13.

Therefore, timing at which the system management software 13 starts processes is influenced by a process delay caused by the managing unit 11. Consequently, even when the failure reproducing apparatus simultaneously performs the information acquisition request and the hardware control, the system management software 13 does not perform the processes for the information acquisition request and the hardware control precisely at the same time. Furthermore, even when each process is executed at a regular interval, the interval of each of the processes that run asynchronously with each other may be gradually disturbed because of interrupt processing, process priority order, or an influence of loads on the OS 14.

Therefore, the failure reproducing apparatus randomly changes execution timing of the information acquisition request and execution timing of the hardware control and determines whether or not an error occurs, in order to identify process timing by which an error is caused. FIG. 21A and FIG. 21B are diagrams explaining timing of processes in a conventional failure reproduction test. As illustrated in FIG. 21A and FIG. 21B, the failure reproducing apparatus employs a method (see FIG. 21A) in which an error is reproduced by repeating processes while the interval between the processes is maintained constant or another method (see FIG. 21B) in which an error is reproduced by repeating processes while the interval between the processes is randomly changed.

As another conventional technology for executing the failure reproducing test, a technology is known in which a history of user operation on an electronic computer system is recorded and the same processes as those of the recorded history of operation is executed to perform the failure reproduction test in order to analyze a cause of a failure. In this conventional technology, it is attempted to reproduce a failure by changing operating conditions in a plurality of ways, for example, by changing environmental information on an information processing apparatus as a tested apparatus or performing a test by changing combinations of operating applications.

Still another technology is known in which a relative relationship between execution start time of a plurality of processes at the time of occurrence of a failure is obtained on the basis of log information recorded in an information processing apparatus being a tested apparatus, and a reproduction test is executed by changing the start time.

Patent Document 1: Japanese Laid-open Patent Publication No. 8-50555

Patent Document 2: Japanese Laid-open Patent Publication No. 6-139093

However, in the above-mentioned conventional technologies, when process timing by which an error is caused is to be identified, the failure reproducing apparatus randomly executes processes at various timing, so that efficiency is reduced, which is a problem.

Furthermore, in the technology in which a history of user operation is recorded and processes are executed in accordance with the recorded history of operation to perform a reproduction test for analyzing a cause of a failure, an operational delay caused by the managing unit 11 as illustrated in FIG. 19 is not taken into account. Therefore, when a path that may cause the operational delay like the managing unit 11 is present, a time lag, i.e., a delay time, occurs in the operation. Therefore, the process timing recorded in the history of operation is not always the same as process timing by which an error is caused. Consequently, it is impossible to reproduce an error unless processes are repeatedly executed in the same environment.

It may be possible to calculate process timing at which a failure has occurred and execute a failure reproduction test intensively at the calculated timing. However, it is preferably to analyze a timing pattern by which a problem occurs, on the basis of log information, and it is also necessary to incorporate the analysis result into the failure reproducing apparatus; therefore, extra time is needed.

SUMMARY

According to an aspect of an embodiment of the invention, a failure reproducing apparatus connected to an information processing apparatus, for reproducing a failure that occurs in the information processing apparatus, the failure reproducing apparatus comprising: a target-time calculating unit that extracts a first process and a second process that have caused the failure, and calculates target time that is a time difference between first execution time at which the information processing apparatus executes the first process that has caused the failure, and second execution time at which the information processing apparatus executes the second process that has caused the failure; an history-information acquiring unit that outputs a first execution command to execute the first process and a second execution command to execute the second process to the information processing apparatus, and acquires history information containing first execution time at which the information processing apparatus executes the first process on the basis of the first execution command, and second execution time at which the information processing apparatus executes the second process on the basis of the second execution command; a delay-time calculating unit that calculates a first delay time which is a time difference between a first output time at which the first execution command is outputted and the first execution time included in the history information; and an adjusting unit that adjusts timing of outputting the first execution command and the second execution command to the information processing apparatus on the basis of the target time and the first delay time.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 illustrates an example of a data structure of a log table;

FIG. 5 illustrates an example of a data structure of a reproduction test log table;

FIG. 6 illustrates an example of a data structure of a detection object log table;

FIG. 7 illustrates an example of a data structure of a process correspondence table;

FIG. 10 illustrates an example of a data structure of execution-timing information;

FIG. 11 illustrates an example of a data structure of an execution timing table;

DESCRIPTION OF EMBODIMENT

Figure 1:
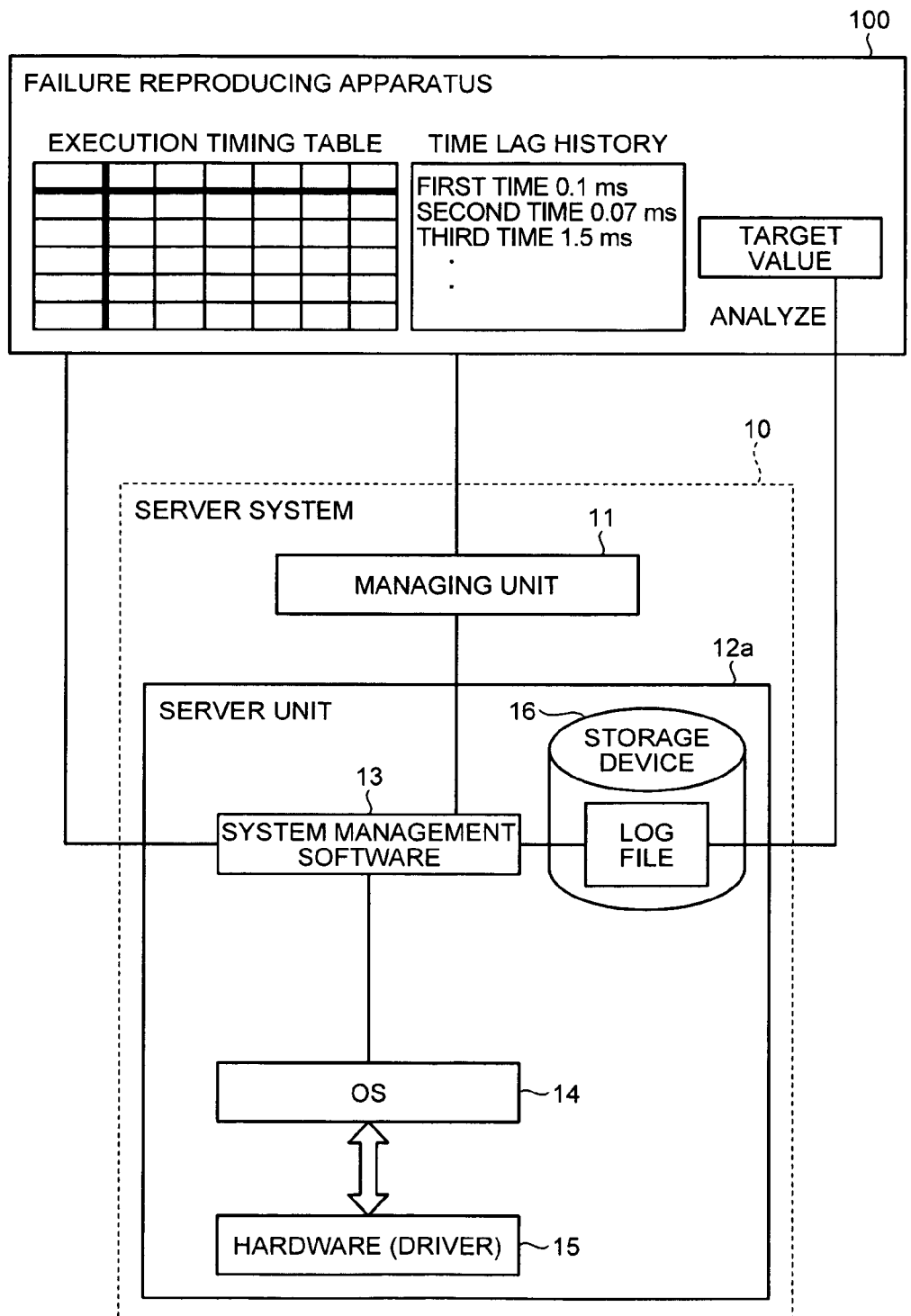
FIG. 1 is a schematic explanatory diagram (1) of a failure reproducing apparatus according to an embodiment.

Embodiments of the present invention will be explained with reference to accompanying drawings.

An overview of a failure reproducing apparatus according to an embodiment will be described below. FIGS. 1, 2A, 2B and 2C are schematic explanatory diagrams of the failure reproducing apparatus according to the embodiment. A server system 10 includes a plurality of server units 12a to 12d, on each of which an OS (Operating System) runs, and a managing unit 11 that monitors and controls the server units 12a to 12d.

The managing unit 11, such as a service processor (SVC), as a system managing device displays information about each of the server units 12a to 12d in the HTML (Hyper Text Markup Language) format in response to a request from a user 1. System management software 13 is installed on the server unit 12a (also on the server units 12b to 12d). The system management software 13 acquires information inside the server unit 12a and controls power supply to hardware (driver) 15.

When, for example, acquiring information from an OS 14, the system management software 13 sends the acquired information in response to a request from the managing unit 11 or re-acquires new information as needed. When the user 1 controls hardware on the server units 12a to 12d, the user 1 issues a request directly to the system management software 13, and the system management software 13 controls the power supply to the hardware 15 via the OS 14.

The system management software 13 stores a series of processes in a log file in a storage device 16 that is a memory. When abnormality occurs, it is possible to identify a cause of the abnormality by analyzing the log file. The log file contains contents of processes, information on process execution time, and the like.

Figure 20:
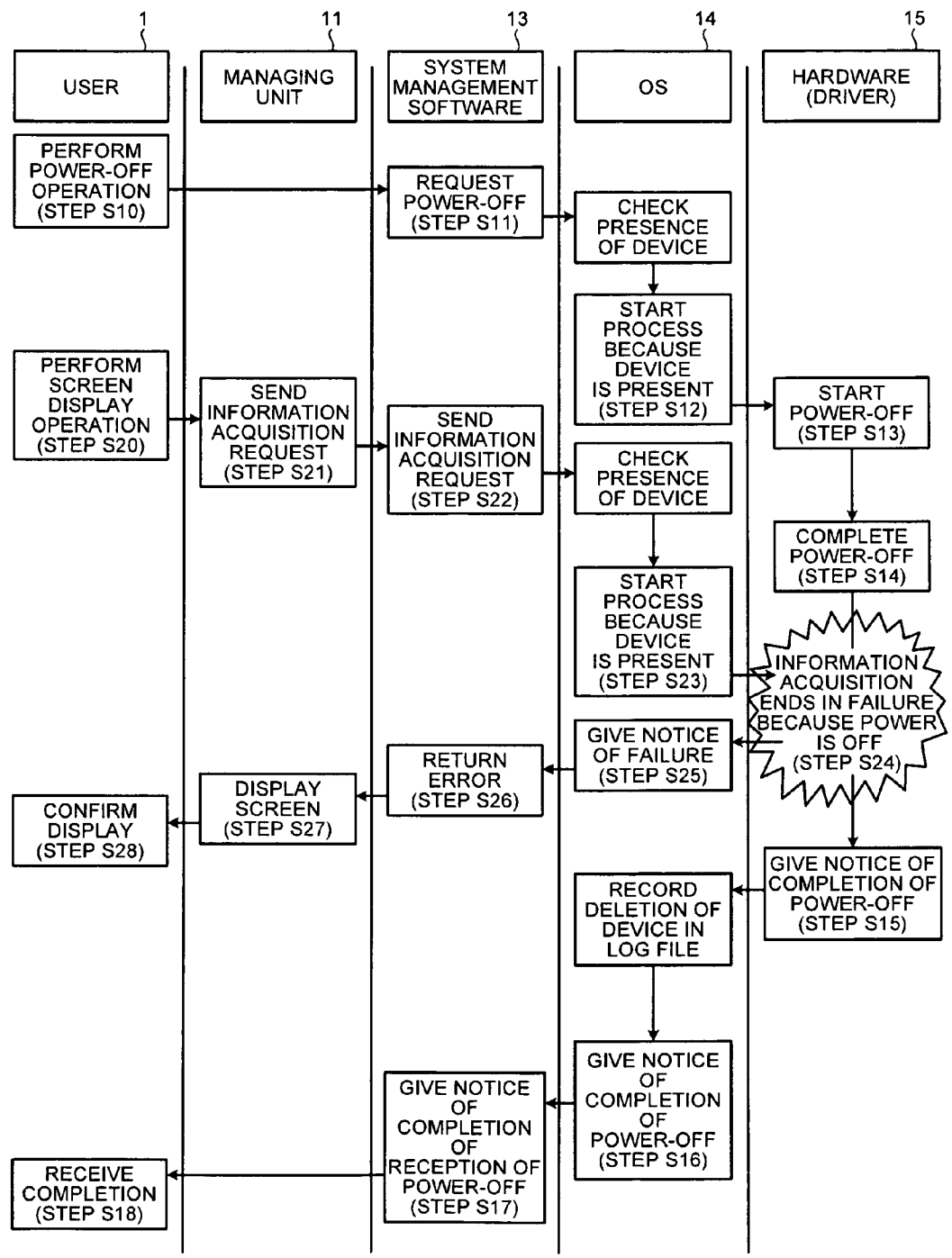
FIG. 20 is a diagram explaining how information acquisition is influenced by hardware control.
Figure 21A:
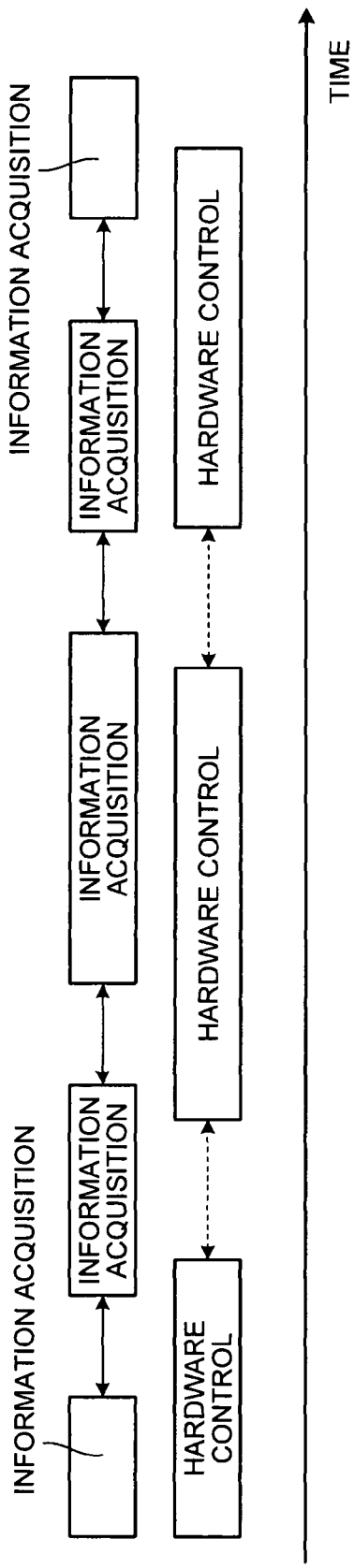
FIG. 21A is a diagram (1) explaining timing of processes in a conventional reproduction test (when interval between processes is constant)
Figure 21B:
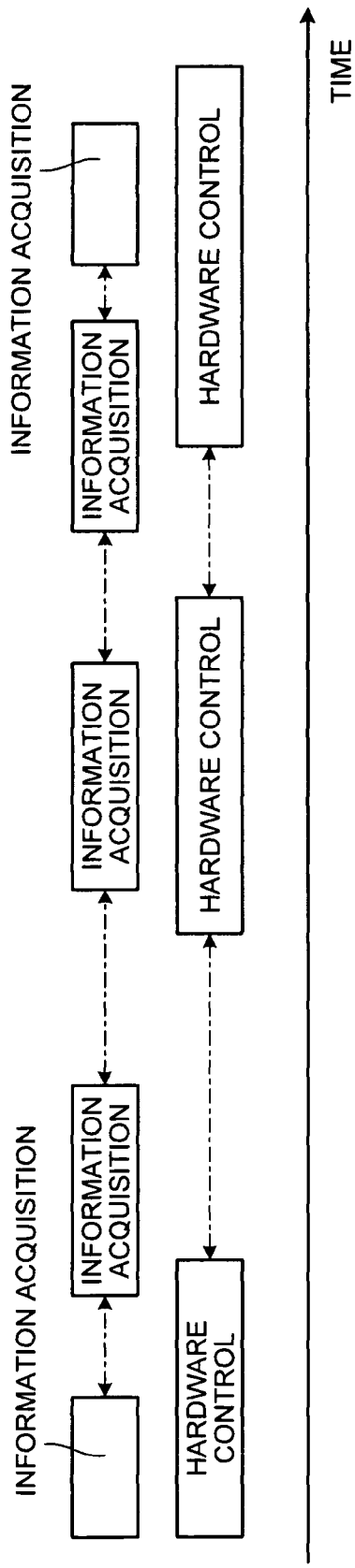
FIG. 21B is a diagram (2) explaining timing of processes in a conventional reproduction test (when interval between processes is random).

When a failure occurs in the server system 10, a failure reproducing apparatus 100 according to the embodiment extracts a first process and a second process that have caused the failure. For example, when a failure as explained earlier with reference to FIG. 20 occurs, the first process corresponds to the control performed by the hardware and the second process corresponds to the image acquisition request.

Subsequently, the failure reproducing apparatus 100 outputs, to the server system 10, execution commands to execute the first process and the second process and acquires, from the server system 10, history information containing time (execution start time) at which the system management software 13 actually executes each of the first process and the second process. The failure reproducing apparatus 100 calculates a time lag from when each execution command is output to when each of the first process and the second process is executed, on the basis of time when the execution commands are output and on the basis of the history information.

Figure 2A:
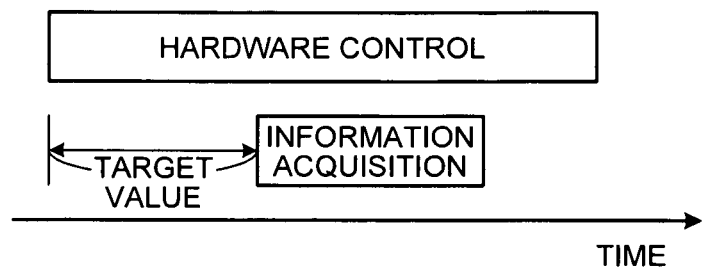
FIG. 2A is a schematic explanatory diagram (2) of the failure reproducing apparatus according to the embodiment.

The failure reproducing apparatus 100 also calculates, as a target value, a difference between time (execution start time) at which the first process is actually executed and time at which the second process is actually executed when the failure occurs in the server system 10 (see FIG. 2A). The failure reproducing apparatus 100 adjusts timing, at which the execution commands for the first process and the second process are output to the server system 10, on the basis of the calculated target value and a delay time as the time lag, and reproduces the failure that has occurred in the server system 10.

Figure 2B:
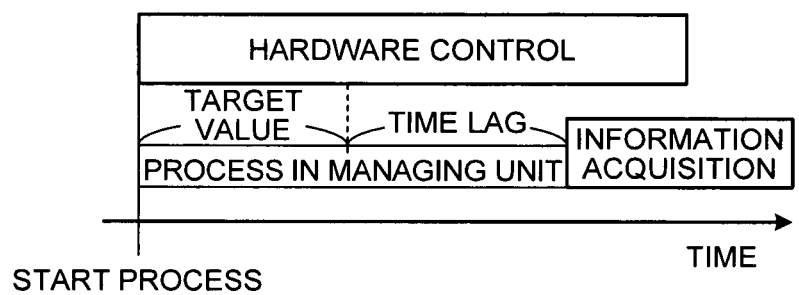
FIG. 2B is a schematic explanatory diagram (3) of the failure reproducing apparatus according to the embodiment (when time lag is not taken into account)

If, for example, the failure reproducing apparatus 100 outputs, to the server system 10, requests to execute the first process and the second process in accordance with the calculated target value without consideration of the delay time, it is impossible to cause the server system 10 to execute the first process and the second process at desired timing due to influence of the delay time caused by the system management software 13 (see FIG. 2B).

Figure 2C:
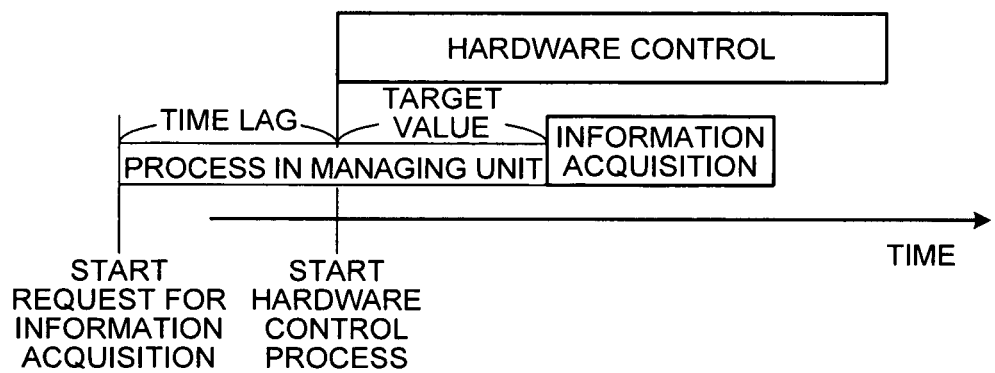
FIG. 2C is a schematic explanatory diagram (4) of the failure reproducing apparatus according to the embodiment (when time lag is not taken into account)

By contrast, as the failure reproducing apparatus 100 of the embodiment does, if the timing at which the execution commands for the first process and the second process are output to the server system 10 is adjusted on the basis of the target value and the delay time as the time lag, it is possible to cause the server system 10 to execute the first process and the second process at desired timing (timing at which a difference between time at which the first process is executed and time at which the second process is executed becomes equal to the target value) (see FIG. 2C). Therefore, it is possible to improve the efficiency of the reproduction test.

The failure reproducing apparatus 100 of the embodiment sequentially records execution histories of processes in an execution timing table every time a failure reproduction test is performed. The execution timing table is increased as the number of failure reproduction tests is increased and therefore can be eventually used as information for statistically processing types of processes, the number of executions of the processes, and success rates for failure reproduction.

Figure 3:
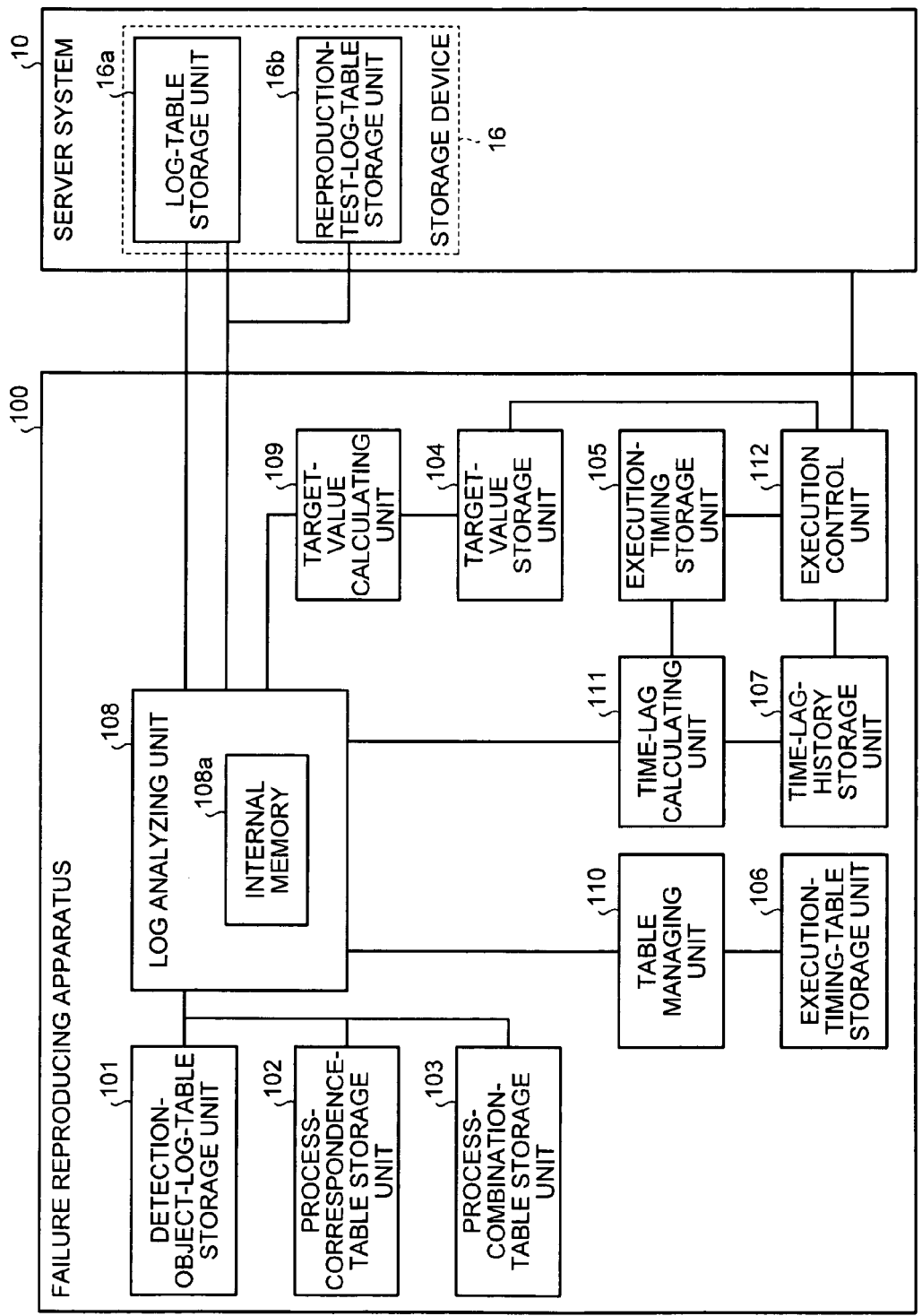
FIG. 3 is a functional block diagram of a configuration of the failure reproducing apparatus according to the embodiment.

The configuration of the failure reproducing apparatus 100 according to the embodiment will be described below. FIG. 3 is a functional block diagram of the configuration of the failure reproducing apparatus 100 according to the embodiment. As illustrated in FIG. 3, the failure reproducing apparatus 100 includes a detection-object-log-table storage unit 101, a process-correspondence-table storage unit 102, a process-combination-table storage unit 103, a target-value storage unit 104, an execution-timing storage unit 105, an execution-timing-table storage unit 106, a time-lag-history storage unit 107, a log analyzing unit 108, a target-value calculating unit 109, a table managing unit 110, a time-lag calculating unit 111, and an execution control unit 112.

Figure 19:
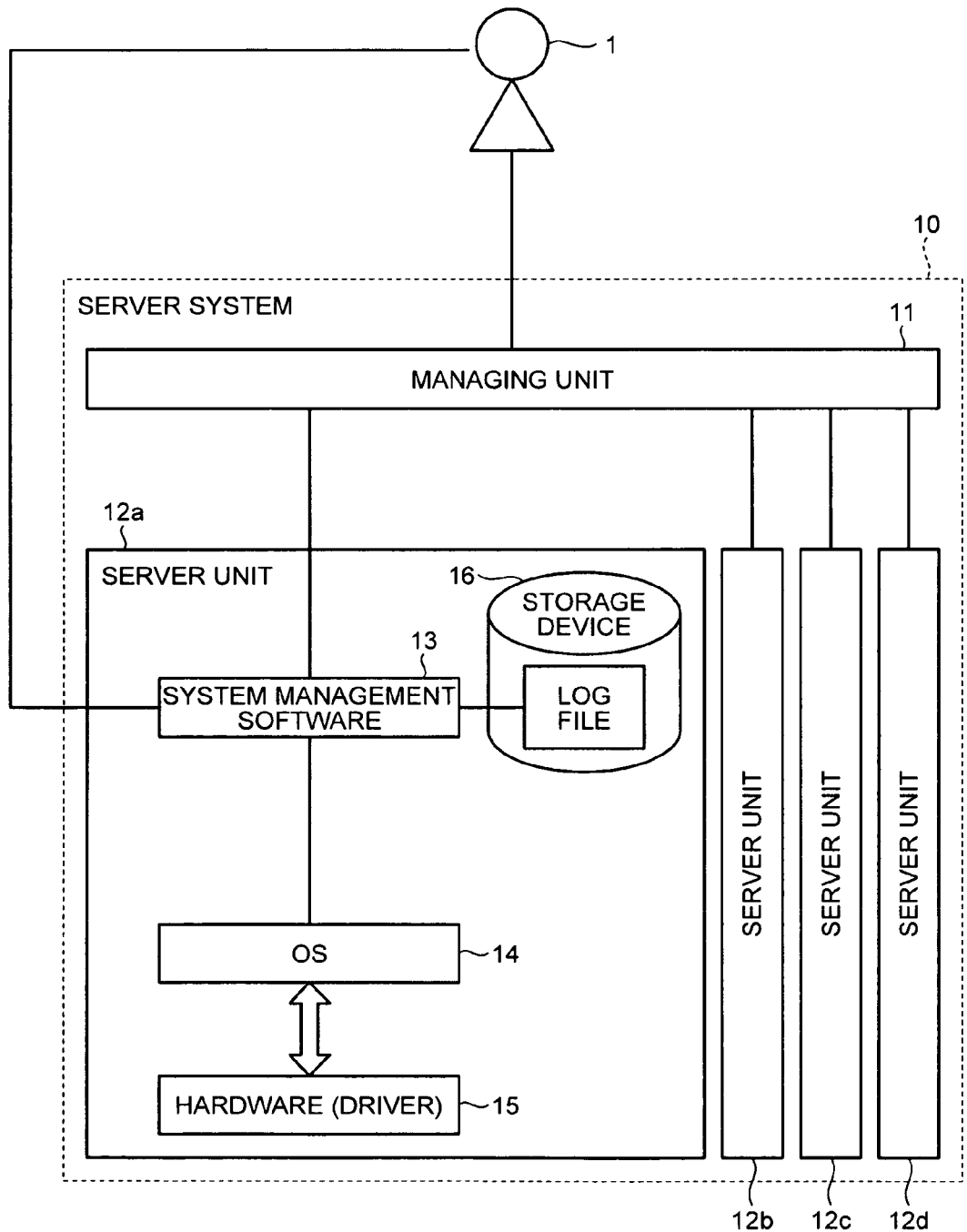
FIG. 19 is a diagram of a configuration of a conventional server system.

The failure reproducing apparatus 100 is connected to the server system 10. The configuration of the server system 10 is the same as the configuration of the server system 10 illustrated in FIG. 19. The storage device 16 includes a log-table storage unit 16a and a reproduction-test-log-table storage unit 16b.

The log-table storage unit 16a is a storage unit for storing a history (a log table) of processes executed by the server system 10. FIG. 4 illustrates an example of a data structure of the log table. As illustrated in the figure, the log table stores therein date and time of execution of processes and the processes in an associated manner.

The reproduction-test-log-table storage unit 16b stores therein a history (a reproduction test log table) of processes that are executed when the server system 10 executes a failure reproduction test. FIG. 5 illustrates an example of a data structure of the reproduction test log table. As illustrated in the figure, execution time, such as date and time of execution of processes (processes of the failure reproduction test), the processes (the processes of the failure reproduction test), and process completion duration are stored in an associated manner. The process completion duration indicates duration from a start of a process to an end of the process.

The server system 10 updates the log table in the log-table storage unit 16a and the reproduction test log table in the reproduction-test-log-table storage unit 16b every time, for example, the system management software 13 (see FIG. 1) executes a process relating to system management. The log table and the reproduction test log table illustrated in FIGS. 4 and 5 are read out by the failure reproducing apparatus 100 and used for calculating the target value, the delay time as the time lag, and the like.

Explanation of the configuration of the failure reproducing apparatus 100 is continued below. The detection-object-log-table storage unit 101 is a storage unit for storing a list (a detection object log table) of logs that are to be determined as failures.

FIG. 6 illustrates an example of a data structure of the detection object log table. As illustrated in FIG. 6, the detection object log table stores therein formats of logs that are to be determined as failures.

The process-correspondence-table storage unit 102 is a storage unit for storing a list (a process correspondence table) of logs related to the logs that are to be determined as failures.

FIG. 7 illustrates an example of a data structure of the process correspondence table. As illustrated in FIG. 7, the process correspondence table stores therein user operation and processes performed by the system management software, in an associated manner.

The process-combination-table storage unit 103 is a storage unit for storing a list (a process combination table) of combinations of processes that may cause a failure.

Figure 8:
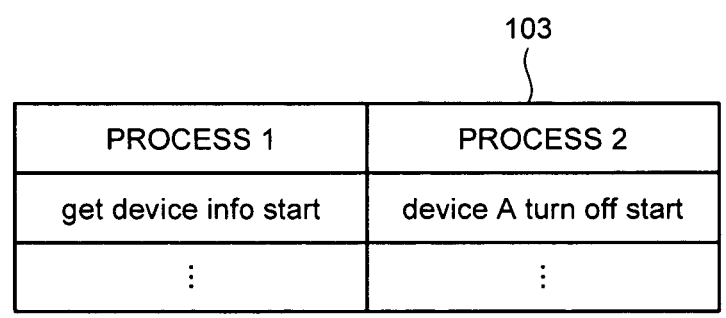
FIG. 8 illustrates an example of a data structure of a process combination table.

FIG. 8 illustrates an example of a data structure of the process combination table. As illustrated in FIG. 8, the process combination table stores therein combinations of processes (combinations of a process 1 and a process 2) that may cause a failure.

The target-value storage unit 104 is a storage unit for storing a list (a target value table) of target values that are differences in start time between processes.

Figure 9:
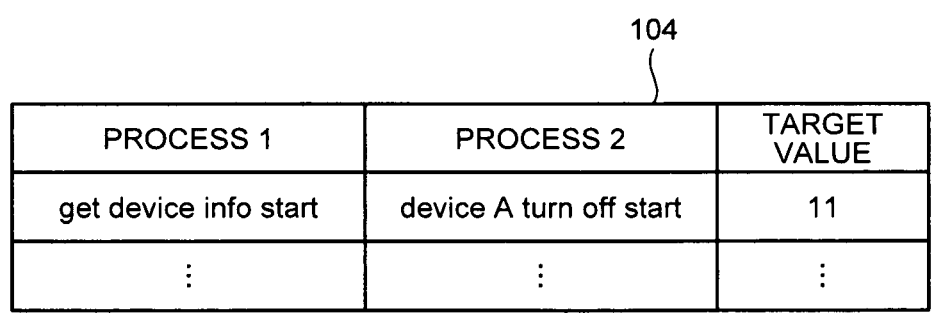
FIG. 9 illustrates an example of a data structure of a target value table.

FIG. 9 illustrates an example of a data structure of the target value table. As illustrated in FIG. 9, the target value table stores therein the process 1, the process 2, and the target value, in an associated manner.

The execution-timing storage unit 105 is a storage unit for storing information (execution-timing information) in which contents of processes, which have been performed in response to a process request that the execution control unit 112 has performed with respect to the server system 10, is associated with time at which the process request is performed.

FIG. 10 illustrates an example of a data structure of the execution-timing information. As illustrated in FIG. 10, the execution-timing information stores therein a content of a process and date and time at which a request for the process is performed. The execution control unit 112 is, for example, an arithmetic processing device, such as a CPU (Central Processing Unit), an MPU (Micro Processing Unit), or a controller, and may be controlled by computer programs such as firmware.

The execution-timing-table storage unit 106 is a storage unit for storing a list (an execution timing table) of execution histories of reproduction tests.

FIG. 11 illustrates an example of a data structure of the execution timing table. In the following, an example of the execution timing table is explained in which the process 1 and the process 2 to be executed in the reproduction test correspond to hardware control and an image acquisition request, respectively. As illustrated in FIG. 11, the execution timing table stores therein process-1 completion duration, delay time, process-2 completion duration, number of executions, and number of failures, in an associated manner.

The process-1 completion duration indicates duration from when the server system 10 starts hardware control to when the server system 10 completes the hardware control. The delay time indicates duration from when the server system 10 starts the hardware control to when the server system 10 starts an information acquisition request.

The process-2 completion duration indicates duration from when the server system 10 starts the information acquisition request to when the server system 10 completes the information acquisition request. The number of executions indicates the number of executions of reproduction tests that are performed with combinations of the process-1 completion duration, the delay time, and the process-2 completion duration. The number of failures indicates the number of times that failures have actually occurred with corresponding combinations.

The time-lag-history storage unit 107 is a storage unit for storing histories (time lag history information) of time lags in each process.

Figures 12, 13:
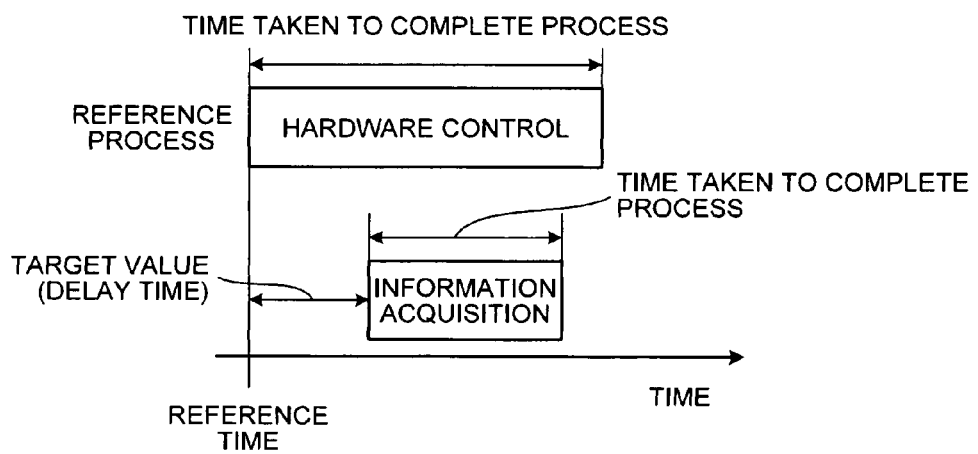
FIG. 12 illustrates an example of a data structure of time lag history information.
FIG. 13 is a diagram explaining processes performed by a target-value calculating unit.

FIG. 12 illustrates an example of a data structure of the time lag history information. As illustrated in FIG. 12, the time lag history information stores therein the process 1, the process 2, execution time of the process 1 performed by the execution control unit 112, execution time of the process 2 performed by the execution control unit 112, and the time lag, in an associated manner.

For example, in the first row of FIG. 12, a time lag of "0.1 ms" is contained for a process that has been executed by the combination of the process 1 "device A turn off start", which is performed on "2008/09/02 10:52:09", and the process 2 "get device info start", which is performed on "2008/09/02 10:52:24". That is, it is indicated that when the failure reproducing apparatus 100 sequentially outputs, to the server system 10, process requests for the process 1 and the process 2 in accordance with a target value, the process 2 is executed by the server system 10 with a delay of "0.1 ms" from expected time.

Explanation of FIG. 3 is continued below. The log analyzing unit 108 is a processing unit that analyzes log data acquired from the server system 10, determines a combination of processes that may cause a failure, and determines whether or not the failure has been reproduced by a reproduction test. In the following, as processes performed by the log analyzing unit 108, a process of extracting a combination of processes that may cause a failure will be explained first, and thereafter, a process of determining a test result of the reproduction test will be explained.

First, the process that the log analyzing unit 108 performs to extract a combination of processes that cause a failure will be explained below. The log analyzing unit 108 acquires, from the server system 10, log data stored in the log-table storage unit 16a. The log data contains date and time at which a process has been executed and a content of the process. The log analyzing unit 108 compares the content of the process of the log data with the detection object log table (see FIG. 6) to determine whether or not the log data corresponds to an error log being a detection object.

For example, when the content of the process of the log data is "device A off start", because the content corresponds to the content of "device * turns off start" in the detection object log table, the log data is determined as log data being the detection object. On the other hand, when the content of the process of the log data does not correspond to any contents in the detection object log table, it is determined that the acquired log data is not the log data being the detection object.

When determining that the acquired log data is not the log data being the detection object, the log analyzing unit 108 acquires next log data from the log-table storage unit 16a and determines whether or not the acquired log data is the log data being the detection object.

When determining that the acquired log data is the log data being the detection object, the log analyzing unit 108 stores the acquired log data in an internal memory (not illustrated) and sequentially acquires pieces of log data that are stored in the log-table storage unit 16a before the acquired log data.

The log analyzing unit 108 compares the pieces of the log data, which are stored in the log-table storage unit 16a before the log data being the detection object, with the process correspondence table (see FIG. 7) to determine whether or not the log data is related to log data that is determined as an error.

For example, when the content of the process of the log data is "get device info start", because the content of the process matches "get device info start" contained in the first row of the process correspondence table, the log data is determined as related log data (determined as being related to log data that is determined as a failure), and the determined log data is stored in an internal memory 108a.

The log analyzing unit 108 combines contents of processes for each two pieces of log data stored in the internal memory 108a and determines whether or not any of the same combinations of the contents of the processes is contained in the process combination table (see FIG. 8). When the same combination is contained in the process combination table, the log analyzing unit 108 outputs corresponding pieces of log data to the target-value calculating unit 109.

For example, when log data with the content of the process of "get device info start" and log data with the content of the process of "device A turn off start" are stored in the internal memory 108a, "get device info start" and "device A turn off start" are combined with each other. When the combined processes and the process combination table are compared with each other, the combined processes match the first row of the process combination table. In this case, the log analyzing unit 108 outputs the log data with the content of the process of "get device info start" and the log data with the content of the process of "device A turn off start" to the target-value calculating unit 109.

Next, the process that the log analyzing unit 108 performs to determine the test result of the reproduction test will be explained below. The log analyzing unit 108 acquires, from the server system 10, log data (hereinafter, reproduction-test log data) stored in the reproduction-test-log-table storage unit 16b (see FIG. 5). The reproduction-test log data contains date and time of execution of a process, a content of the process, and process completion duration. The log analyzing unit 108 compares the content of the process of the reproduction-test log data with the detection object log table to determine whether or not the reproduction-test log data is an error log being a detection object.

When determining that the reproduction-test log data is the error log being the detection object, the log analyzing unit 108 determines that a failure is reproduced by the reproduction test. When determining that the failure is reproduced, the log analyzing unit 108 outputs the reproduction-test log data with which a failure has occurred to the table managing unit 110.

On the other hand, when determining that the reproduction-test log data is not the error log being the detection object, the log analyzing unit 108 compares the reproduction-test log data with the process correspondence table to determine whether or not the reproduction-test log data is log data (reproduction-test log data) related to an error with which a failure has occurred.

When determining that the reproduction-test log data is related to the log data with which the failure has occurred, the log analyzing unit 108 outputs the determined reproduction-test log data to the table managing unit 110 and the time-lag calculating unit 111.

The target-value calculating unit 109 is a processing unit that calculates a target value that indicates a difference between time at which the first process (for example, the hardware control) is actually executed and time at which the second process (for example, the information acquisition request) is actually executed at the time of occurrence of a failure in the server system 10.

The target-value calculating unit 109 acquires a combination of pieces of log data from the log analyzing unit 108 and calculates the target value on the basis of date and time contained in the acquired pieces of log data.

FIG. 13 is a diagram explaining processes performed by the target-value calculating unit 109. In the following, as an example, it is assumed that the contents of the processes correspond to the hardware control and the information acquisition request, date and time of execution of the hardware control is "2008/9/2 10:52:13", and date and time of execution of the information acquisition request is "2008/9/2 10:52:24".

As illustrated in FIG. 13, when the hardware control, which is performed first, is used as a reference, the information acquisition request is executed with a delay of 11 seconds in comparison with the hardware control. Therefore, the target-value calculating unit 109 calculates 11 seconds as the target value and registers a calculation result in the target-value storage unit 104 in association with each process (see the first row of FIG. 9).

The table managing unit 110 is a processing unit that updates the execution timing table (see FIG. 11) on the basis of a test result of a reproduction test, which is output from the log analyzing unit 108. More specifically, the table managing unit 110 acquires, from the log analyzing unit 108, the reproduction-test log data with which a failure has been reproduced and the reproduction-test log data related to the log data with which the failure has occurred, and registers a combination of the acquired processes in the execution timing table.

When the combination of the processes is already registered in the execution timing table, the table managing unit 110 adds 1 to the number of executions. When the combination is not registered, the table managing unit 110 registers the combination of the processes in the execution timing table. As illustrated in FIG. 11, even when the contents of the processes are the same, it is possible to register a combination of processes with respect to each process completion duration or each delay time in the execution timing table. It is also possible to register the number of failures in addition to the number of executions in the execution timing table on the basis of whether or not a failure has actually occurred.

Figure 14A:
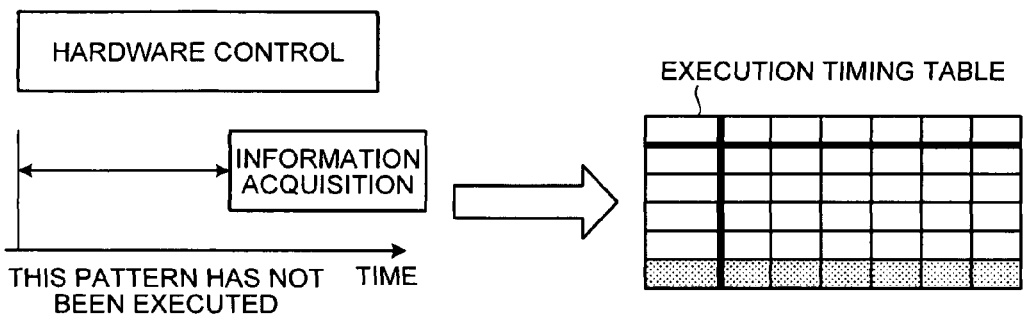
FIG. 14 is a diagram explaining processes performed by a table managing unit.
Figure 14B:
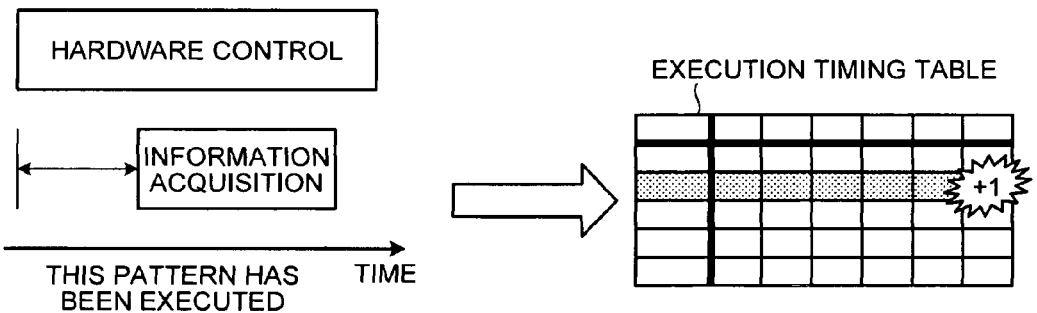

FIG. 14A and FIG. 14B are diagrams explaining processes performed by the table managing unit 110. As illustrated in FIG. 14A, when a pattern that has not been executed (for example, a pattern formed of a content of each process and delay time) is output from the log analyzing unit 108, a new pattern is registered in the execution timing table. On the other hand, when a pattern that has been registered is output from the log analyzing unit 108, 1 is added to the number of executions corresponding to the pattern. (see FIG. 14B)

The time-lag calculating unit 111 is a processing unit that calculates duration from when the execution control unit 112 outputs a process execution command to the server system 10 to when the server system 10 actually executes a process corresponding to the execution command, that is, calculates a time lag. The time-lag calculating unit 111 registers a calculation result and a content of each process in the time-lag-history storage unit 107 (see FIG. 12) in an associated manner.

More specifically, when acquiring the reproduction-test log data from the log analyzing unit 108, the time-lag calculating unit 111 detects date and time of a process having the same content as the content of the process in the acquired reproduction-test log data from the execution-timing storage unit 105 (see FIG. 10). For example, when the content of the process in the reproduction-test log data is "device A turn off start", the time-lag calculating unit 111 extracts time "2008/09/02 10:52:09" from the execution-timing storage unit 105.

The time-lag calculating unit 111 calculates a time lag by calculating a difference between the date and time contained in the reproduction-test log data and the date and time detected from the execution-timing storage unit 105. The time-lag calculating unit 111 sequentially registers time lags in the time-lag-history storage unit 107 in association with combinations of processes.

The execution control unit 112 is a processing unit that adjusts timing on the basis of the target value stored in the target-value storage unit 104 and the time lag stored in the time-lag-history storage unit 107 and thereafter outputs, to the server system 10, an execution command of each process related to the reproduction test.

An example of concrete processes performed by the execution control unit 112 will be explained below. In the following, it is assumed that processes of the reproduction test are hardware control (device A turn off start) and an information acquisition request (get device info start) and a command for the hardware control is output to the server system 10 in advance of a command for the information acquisition request.

The execution control unit 112 acquires a target value corresponding to a combination of the hardware control and the information acquisition request from the target-value storage unit 104. Referring to FIG. 9, the target value corresponding to the combination of the hardware control and the information acquisition request is "11 (seconds)".

The execution control unit 112 then acquires a time lag corresponding to the combination of the hardware control and the information acquisition request from the time-lag-history storage unit 107. Referring to FIG. 12, a plurality of time lags (0.1 ms, 0.07 ms, and 1.5 ms) is present for the combination of the hardware control and the information acquisition request. When a plurality of time lags is present, the execution control unit 112 calculates, for example, an average of the time lags and uses the calculated average as a time lag.

When the reproduction test is executed, the execution control unit 112 first outputs an execution command for the hardware control, and after a period of time corresponding to a sum of the target value and the time lag has elapsed, outputs an execution command for the information acquisition request.

As described above, when the reproduction test is performed, the execution control unit 112 adjusts timing of output of an execution command for each process by taking into account not only the target value but also the time lag that occurs in the server system 10. Therefore, it is possible to efficiently perform the reproduction test.

It is explained above, as an example, that the execution control unit 112 calculates an average of time lags when calculating the time lag. However, the present invention is not limited to this example. For example, the execution control unit 112 may use a time lag that is lastly registered among the time lags stored in the time-lag calculating unit 111. It is also possible to acquire time lags that are registered within a predetermined period of time starting from a time point at which a time lag is lastly registered, and correct an average of the time lags by using the number of the acquired time lags as a weight factor.

Figure 15:
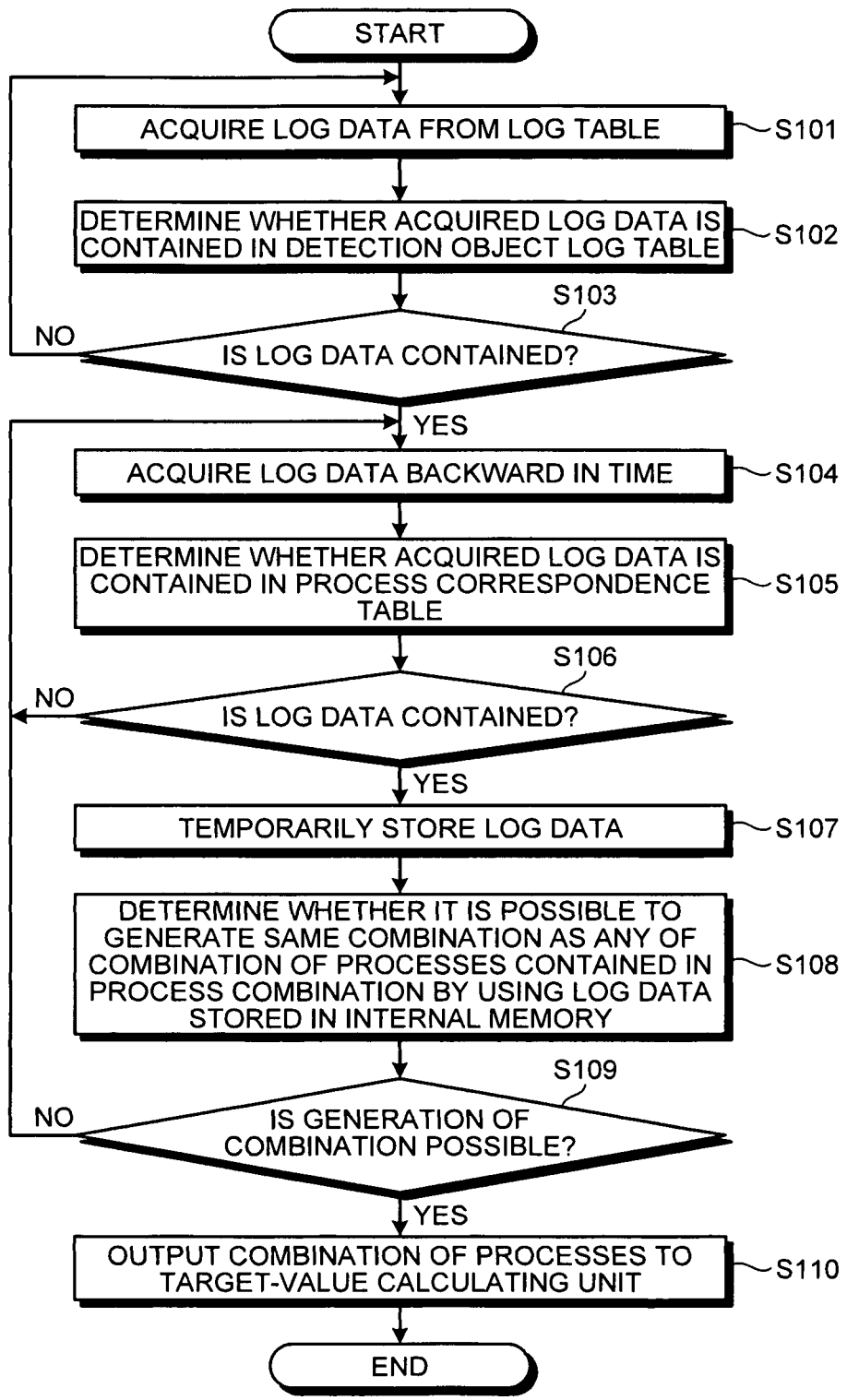
FIG. 15 is a flowchart of the flow of a process of identifying log data with which a failure has occurred.

The flow of a process performed by the failure reproducing apparatus 100 will be explained below. FIG. 15 is a flowchart of the flow of a process of determining log data with which a failure has occurred. As illustrated in FIG. 15, in the failure reproducing apparatus 100, the log analyzing unit 108 acquires log data from the log table (Step S101), and determines whether or not the acquired log data is contained in the detection object log table (Step S102).

When the log data is not contained in the detection object log table (NO at Step S103), the process returns to Step S101. On the other hand, when the log data is contained in the detection object log table (YES at Step S13), the log analyzing unit 108 acquires log data backward in time from the log table (Step S104).

The log analyzing unit 108 determines whether or not the acquired log data is contained in the process correspondence table (Step S105). When the log data is not contained (NO at Step S106), the process returns to Step S104. On the other hand, when the log data is contained (YES at Step S106), the log data is temporarily stored in the internal memory (Step S107).

The log analyzing unit 108 determines whether or not it is possible to generate the same combination as any combination of processes contained in the process combination table by using any pieces of log data stored in the internal memory (Step S108). When it is impossible to generate the combination (NO at Step S109), the process returns to Step S104.

On the other hand, when it is possible to generate the same combination as any combination of processes contained in the process combination table by using any pieces of log data stored in the internal memory (YES at Step S109), the log analyzing unit 108 outputs the combination of the processes to the target-value calculating unit 109 (Step S110).

Figure 16:
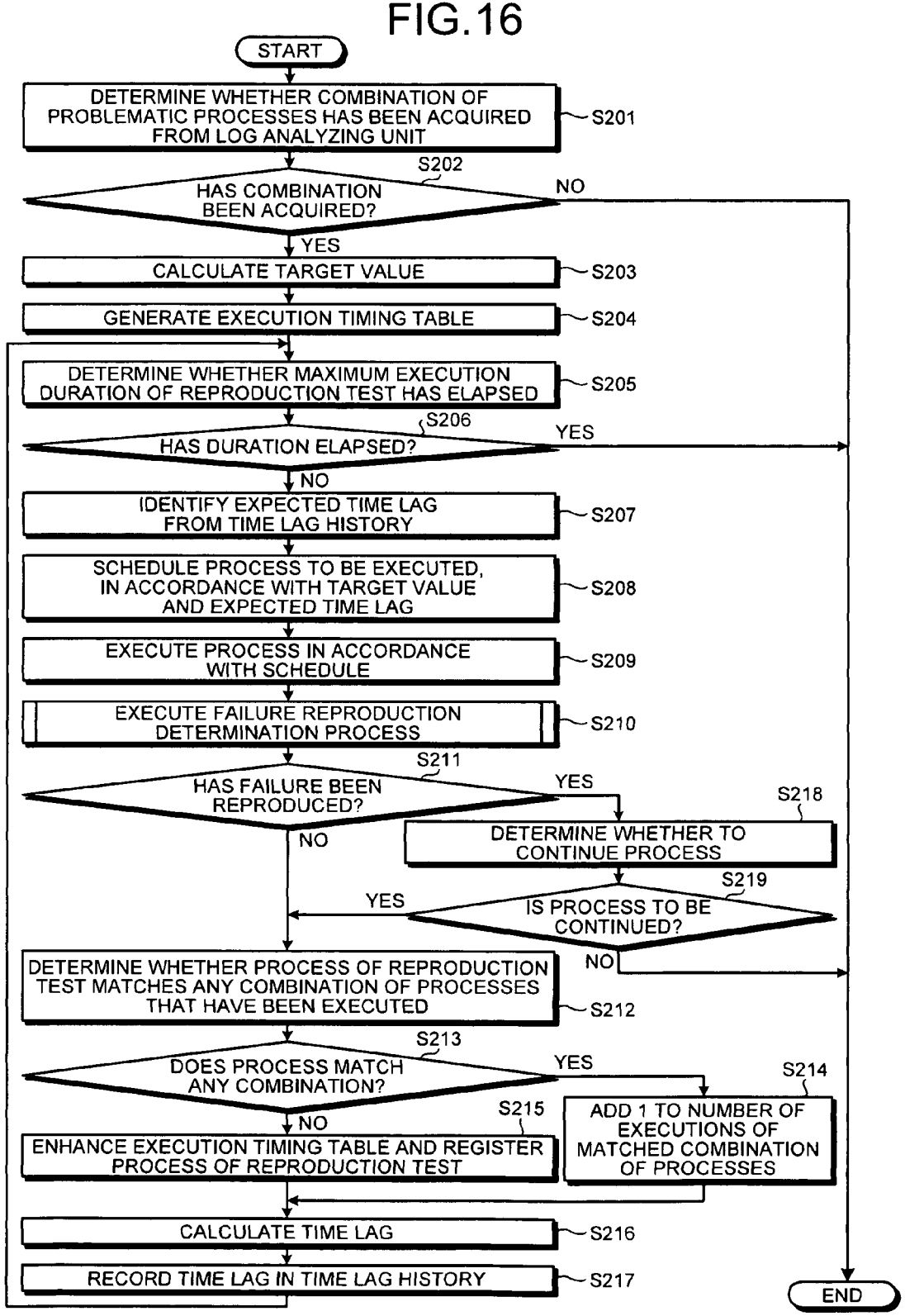
FIG. 16 is a flowchart of the flow of a process of a reproduction test.

FIG. 16 is a flowchart of the flow of a process of the reproduction test. As illustrated in the figure, the failure reproducing apparatus 100 determines whether or not the target-value calculating unit 109 has acquired the combination of problematic processes (the combination of the pieces of log data) from the log analyzing unit 108 (Step S201). When the combination has not been acquired (NO at Step S202), the process ends.

On the other hand, when the target-value calculating unit 109 has acquired the combination of the problematic processes (YES at Step S202), the target value calculating unit 109 calculates the target value (Step S203) and the table managing unit 110 generates the execution timing table (Step S204).

The failure reproducing apparatus 100 determines whether or not the maximum execution duration of the reproduction test has elapsed (Step S205). When the maximum execution time has elapsed (YES at Step S206), the process ends. On the other hand, when the maximum execution duration of the reproduction test has not elapsed (NO at Step S206), the execution control unit 112 identifies an expected time lag from a time lag history (Step S207).

The execution control unit 112 schedules processes to be executed, in accordance with the target value and the expected time lag (Step S208), executes the processes in accordance with the schedule (Step S209), and executes a failure reproduction determination process (Step S210).

When a determination result of the failure reproduction determination process indicates that a failure has not been reproduced (NO at Step S211), the table managing unit 110 determines whether or not the processes of the reproduction test matches any combination of processes that have been executed (Step S212).

When the processes match the combination of the processes that have been executed (YES at Step S213), the table managing unit 110 adds 1 to the number of executions of the matched combination of the processes in the execution timing table (Step S214), and the process proceeds to Step S216.

On the other hand, when the processes do not match the combination of the processes that have been executed (NO at Step S213), the table managing unit 110 enhances the execution timing table and registers the processes of the reproduction test (Step S215). Then, the time-lag calculating unit 111 calculates the time lag (Step S216) and records the time lag in the time lag history (Step S217). Thereafter, the process proceeds to Step S205.

When determining that the failure has been reproduced at Step S211 (YES at Step S211), the failure reproducing apparatus 100 determines whether or not to continue the process (Step S218). When the process is to be continued (YES at Step S219), the process proceeds to Step S212. When the process is not to be continued (NO at Step S219), the process ends.

Figure 17:
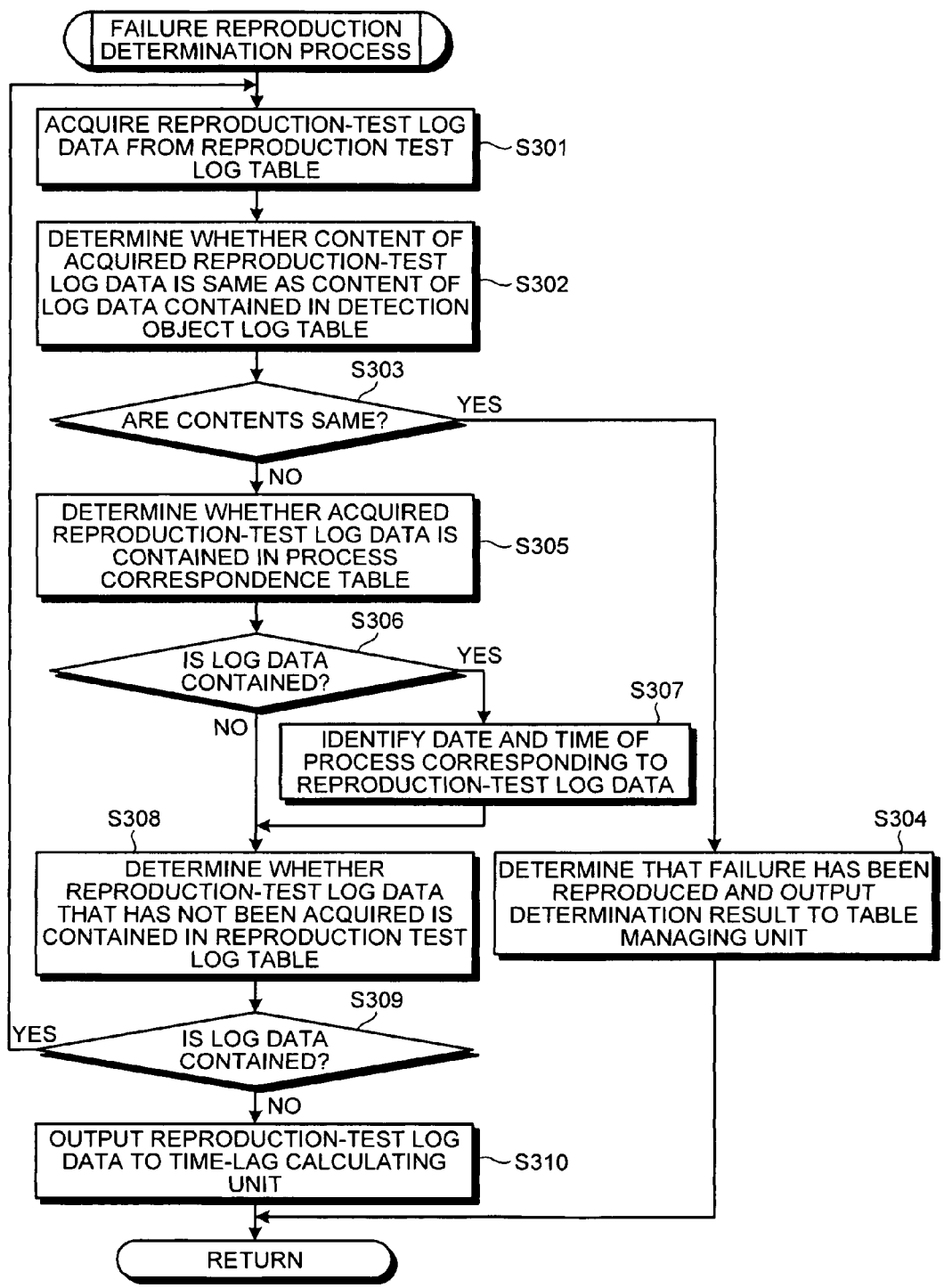
FIG. 17 is a flowchart of the flow of a failure reproduction determination process.

The flow of the failure reproduction determination process at Step S210 of FIG. 16 will be explained below. FIG. 17 is a flowchart of the flow of the failure reproduction determination process. As illustrated in FIG. 17, in the failure reproducing apparatus 100, the log analyzing unit 108 acquires reproduction-test log data from the reproduction test log table (Step S301) and determines whether or not the content of the acquired reproduction-test log data is the same as any content of log data contained in the detection object log table (Step S302).

When the contents are the same (YES at Step S303), the log analyzing unit 108 determines that the failure has been reproduced, outputs a determination result to the table managing unit 110 (Step S304), and ends the failure reproduction determination process.

On the other hand, when the same content is not contained in the detection object log table (NO at Step S303), the log analyzing unit 108 determines whether or not the reproduction-test log data is contained in the process correspondence table (Step S305). When the log data is contained (YES at Step S306), execution time of the reproduction-test log data is identified (Step S307) and the process proceeds to Step S308.

On the other hand, when the reproduction-test log data is not contained in the process correspondence table (NO at Step S306), the log analyzing unit 108 determines whether or not reproduction-test log data that has not been acquired is contained in the reproduction test log table (Step S308).

When the reproduction-test log data that has not been acquired is contained (YES at Step S309), the process proceeds to Step S301. On the other hand, when the reproduction-test log data that has not been acquired is not contained (NO at Step S309), the reproduction-test log data is output to the time-lag calculating unit 111 (Step S310) and the failure reproduction determination process ends.

As described above, the failure reproducing apparatus 100 according to the embodiment is configured such that when a failure occurs in a server system, the log analyzing unit 108 extracts processes that have caused the failure, the target-value calculating unit 109 calculates a target value on the basis of execution time of each process, and the time-lag calculating unit 111 calculates a time lag. Then, the execution control unit 112 adjusts timing of output of an execution command for each process to the server system 10 on the basis of the target value and the time lag, and executes a reproduction test. Therefore, even when a time lag occurs in the server system, it is possible to improve efficiency of reproduction of processes relating to the occurrence of the failure.

Among the processes described in the present embodiments, all or a part of the processes explained to be automatically performed can be manually performed, or all or a part of the processes explained to be manually performed can be automatically performed with any known methods. Also, processing procedures, control procedures, concrete titles, and information including various types of data and parameters, which are described in the document and the drawings, can be arbitrarily changed unless otherwise specified.

The components of each device illustrated in the drawings are only for conceptually illustrating the functions thereof and are not necessarily physically configured as illustrated in the drawings. In other words, the specific form of a separate or integrated device is not limited to the drawings. All or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Figure 18:
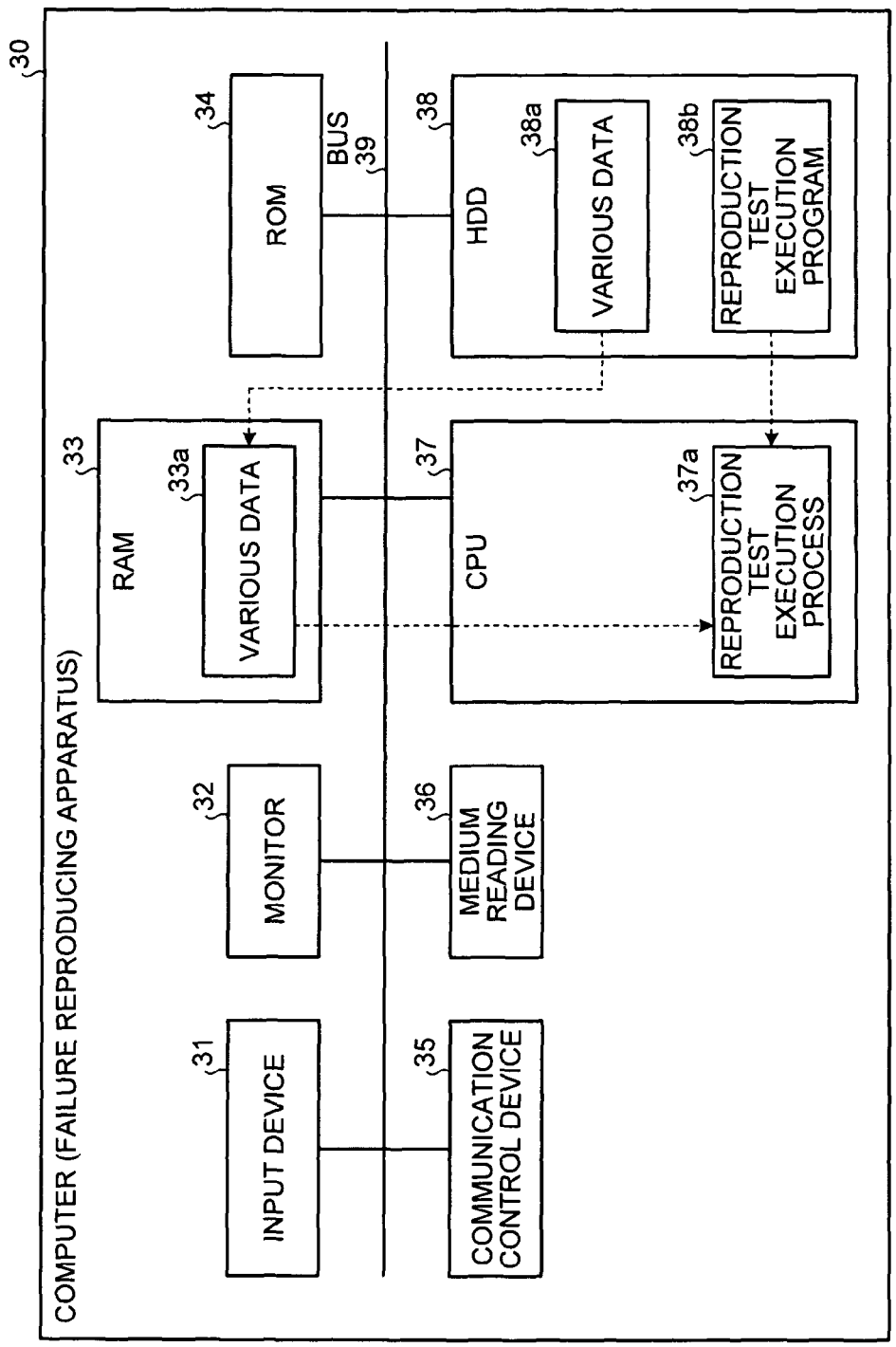
FIG. 18 is a hardware configuration diagram of a computer that makes up the failure reproducing apparatus according to the embodiment.

FIG. 18 is a hardware configuration diagram of a computer 30 that makes up the failure reproducing apparatus according to the embodiment. As illustrated in FIG. 18, the computer (the failure reproducing apparatus) 30 includes an input device 31, a monitor 32, a RAM (Random Access Memory) 33, a ROM (Read Only Memory) 34, a communication control device 35 that controls data communication with a tested apparatus (e.g., the server system 10), a medium reading device 36 that reads information from a storage medium, a CPU (Central Processing Unit) 37, and an HDD (Hard Disk Drive) 38, which are connected to one another via a bus 39.

A reproduction test execution program 38b for implementing the same functions as the functions of the failure reproducing apparatus 100 described above is stored in the HDD 38. The CPU 37 reads and executes the reproduction test execution program 38b thereby a reproduction test execution process 37a is activated. The reproduction test execution process 37a corresponds to the log analyzing unit 108, the target-value calculating unit 109, the table managing unit 110, the time-lag calculating unit 111, and the execution control unit 112, which are illustrated in FIG. 3.

The HDD 38 stores therein various data 38a, which corresponds to data stored in the detection-object-log-table storage unit 101, the process-correspondence-table storage unit 102, the process-combination-table storage unit 103, the target-value storage unit 104, the execution-timing storage unit 105, the execution-timing-table storage unit 106, and the time-lag-history storage unit 107 as illustrated in FIG. 3. The CPU 37 reads the various data 38a stored in the HDD 38 onto the RAM 33 and calculates a target value and a time lag on the basis of various data 33a and log data of the tested apparatus input from the communication control device 35, thereby executes a reproduction test.

The reproduction test execution program 38b illustrated in FIG. 18 is not necessarily stored in the HDD 38 in advance. For example, the reproduction test execution program 38b may be stored in a "portable physical medium", such as a flexible disk (FD), a CD-ROM, a DVD disk, a magnet-optical disk, or an IC card, that are inserted into a computer, a "fixed physical medium", such as a hard disk drive (HDD) that is provided inside or outside the computer, or "another computer system (or a server)" that is connected to the computer via a public line, the Internet, LAN, WAN, or the like, so that the computer can read out and execute the reproduction test execution program 38b from these media.

According to the failure reproducing apparatus, a reproduction test is performed by taking into account a time lag that may occur in a tested apparatus. Therefore, it is possible to efficiently reproduce processes that cause a failure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A failure reproducing apparatus connected to an information processing apparatus, for reproducing a failure that occurs in the information processing apparatus, the failure reproducing apparatus comprising:
    a target-time calculating unit that extracts a first process and a second process that have caused the failure, and calculates target time that is a time difference between first execution time at which the information processing apparatus executes the first process that has caused the failure, and second execution time at which the information processing apparatus executes the second process that has caused the failure;
    an history-information acquiring unit that outputs a first execution command to execute the first process and a second execution command to execute the second process to the information processing apparatus, and acquires history information containing first execution time at which the information processing apparatus executes the first process on the basis of the first execution command, and second execution time at which the information processing apparatus executes the second process on the basis of the second execution command;
    a delay-time calculating unit that calculates a delay time of the second execution command which is a time difference between a second output time at which the second execution command is outputted and the second execution time included in the history information, the delay time corresponding to the combination of the first execution command and the second execution command; and
    an adjusting unit that outputs the second execution command to the information processing apparatus when a period of time obtained by adding the delay time and the target time elapses, after outputting the first execution command.

2. The failure reproducing apparatus according to claim 1, further comprising:
    an analyzing unit that determines whether a failure is reproduced by the failure reproducing apparatus, and a storage unit that stores a result of the determination determined by the analyzing unit.

3. A failure reproducing method implemented by a failure reproducing apparatus that is connected to an information processing apparatus, for reproducing a failure that occurs in the information processing apparatus, the failure reproducing method comprising:
    extracting a first process and a second process that have caused the failure when a failure occurs in the information processing apparatus;
    calculating target time that is a time difference between first execution time at which the information processing apparatus executes the first process, and second execution time at which the information processing apparatus executes the second process;
    outputting a first execution command to execute the first process and a second execution command to execute the second process to the information processing apparatus;
    acquiring history information containing the first execution time and the second execution time;
    calculating a delay time of the second execution command which is a time difference between a second output time at which the second execution command is outputted and the second execution time included in the history information, the delay time corresponding to the combination of the first execution command and the second execution command; and
    outputting the second execution command to the information processing apparatus when a period of time obtained by adding the delay time and the target time elapses, after outputting the first execution command.

4. The failure reproducing method according to claim 3, further comprising:
    determining whether a failure is reproduced by the failure reproducing apparatus; and
    storing a result of determination made at the determining in a storage unit of the failure reproducing apparatus.

5. A computer-readable, non-transitory medium storing a failure reproducing program for causing a failure reproducing apparatus to execute a process, the failure reproducing apparatus being connected to an information processing apparatus for reproducing a failure that occurs in the information processing apparatus, the process comprising:
    extracting a first process and a second process that have caused the failure;
    calculating target time that is a time difference between first execution time at which the information processing apparatus executes the first process, and second execution time at which the information processing apparatus executes the second process;
    outputting a first execution command to execute the first process and a second execution command to execute the second process to the information processing apparatus;
    acquiring history information containing the first execution time and the second execution time;
    calculating a delay time of the second execution command, which is a time difference between a second output time at which the second execution command is outputted and the second execution time included in the history information, the delay time corresponding to the combination of the first execution command and the second execution command; and outputting the second execution command to the information processing apparatus when a period of time obtained by adding the delay time and the target time elapses, after outputting the first execution command.

6. The computer-readable, non-transitory medium according to claim 5, the process further comprises:

determining whether a failure is reproduced by the failure reproducing apparatus; and storing a result of determination made at the determining in a determination-result storage unit of the failure reproducing apparatus.

* * * * *